Sept. 14, 1926.                E. MANDELBAUM                1,600,191
                                    ROLL
                            Filed Jan. 26, 1925
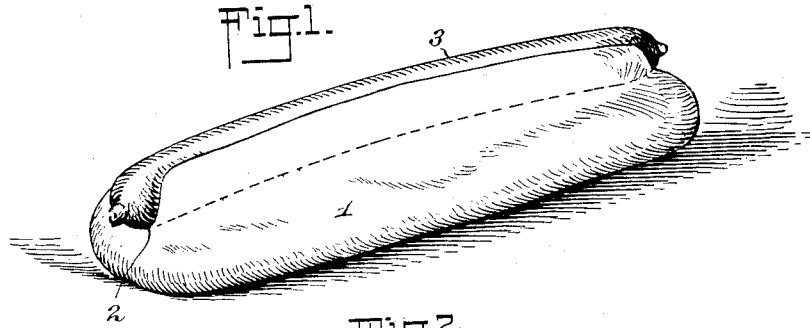
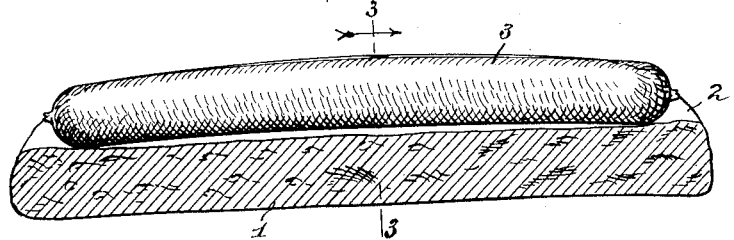
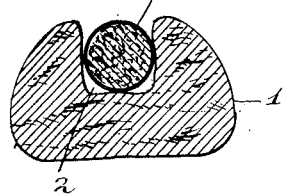
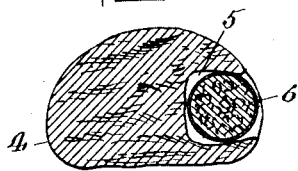
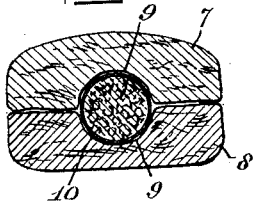
WITNESSES
                                                INVENTOR
                                           Edward Mandelbaum
                                           BY
                                                ATTORNEYS Patented Sept. 14, 1926.

1,600,191

UNITED STATES PATENT OFFICE.

EDWARD MANDELBAUM, OF NEW YORK, N. Y.

ROLL.

Application filed January 26, 1925. Serial No. 4,786.

This invention relates to rolls, an object of the invention being to provide an edible roll so shaped as to form a receptacle or compartment or space for the reception of a frankfurter, sausage or other edible material to form a sandwich.

While I shall hereinafter refer to my improved roll as being especially adapted for receiving a frankfurter and the like, I would have it distinctly understood that I desire to cover the roll broadly for use as a sandwich roll to receive any edible material or combination of materials.

I am aware of the fact that rolls have been made with sausages or frankfurters cooked therein, and I am also, of course, aware of the fact that rolls have been opened or cut to receive sausages and the like in the formation of sandwiches, but it is the purpose of my invention to provide a roll which does not require any cutting or shaping and which of itself is so shaped as to receive a sausage or other edible material and to properly hold the same with such dressing or flavoring as may be desired, so that the sandwich as a whole can be conveniently handled without soiling the hands or the clothing and will be neat and attractive in appearance and a great labor saving device.

With these and other objects in view, the invention consists in certain novel features of construction and combinations and arrangements of parts which will be more fully hereinafter described and pointed out in the claims.

In the accompanying drawings:—

Figure 1 is a perspective view showing my improved roll having a longitudinal groove or compartment in its upper portion with a frankfurter or sausage therein;

Figure 2 is a view in longitudinal section of the roll shown in Figure 1;

Figure 3 is a view in transverse section on the line 3—3 of Figure 2;

Figure 4 is a view similar to Figure 3, illustrating a modification;

Figure 5 is a view similar to Figure 3, illustrating another modification.

Referring more particularly to Figures 1, 2 and 3 of the drawings, 1 represents a roll which is of any suitable edible material such as made from dough and baked in any approved manner. The roll is shown as elongated in form, which is a common preferred type, but, of course, the invention is not limited to any proportions or shape of the roll itself.

As shown in Figures 1, 2 and 3, a longitudinal groove or compartment 2 is provided in the upper portion of the roll, which is of a sufficient size both as to depth, transverse dimension and longitudinal dimension to properly receive a sausage 3 or other edible material.

In Figure 4 I illustrate a roll 4 as having a longitudinal groove, recess or compartment 5 in one side thereof to receive a sausage 6 or other edible material.

In Figure 5 I show a roll made of two sections 7 and 8 having recesses or grooves 9 formed in their inner faces so that when these sections 7 and 8 are together a compartment is provided to receive a sausage or other edible material.

In employing this term "roll" I use it in its ordinary sense to define an edible article made up of dough, such as is employed in the making of bread, or, in other words, to include a roll which distinguishes from pastry and the like.

It is, therefore, the broad idea of my invention to provide a roll which is baked or cooked in any approved manner and which has a space or compartment formed therein to receive a sausage or other edible material, and I, therefore, do not limit myself to the precise details set forth but consider myself at liberty to make such slight changes and alterations as fairly fall within the spirit and scope of the appended claims.

I claim:

1. A sandwich roll having in its top a longitudinal trough-like cavity opening through both of its ends and adapted to receive a sausage or similarly shaped core, the roll and its cavity being completely formed independently of the core but in readiness to receive the same, the roll being of a non-brittle nature to permit spreading of the roll to admit the core.

2. A sandwich roll having a longitudinal trough-like cavity opening through both of its ends and adapted to receive a sausage or similarly shaped core, the roll and its cavity being completely formed independently of the core but in readiness to receive the same, the roll having its body open along the outer side of said cavity from end to end of the roll, permitting spreading to receive the core, the roll being of a non-brittle nature to permit such spreading without breaking.

EDWARD MANDELBAUM.